United States Patent Office 3,489,778
Patented Jan. 13, 1970

3,489,778
HYDROGENATION OF UNSATURATED
ALIPHATIC COMPOUNDS
Leendert Pieter van 't Hof, Vlaardingen, Netherlands, assignor to Lever Brothers Company, New York, N.Y., a corporation of Maine
No Drawing. Filed Apr. 4, 1967, Ser. No. 628,257
Claims priority, application Netherlands, Apr. 7, 1966, 6604800, 6604801, 6604802
Int. Cl. C11c 3/12; C07c 5/04
U.S. Cl. 260—409          2 Claims

ABSTRACT OF THE DISCLOSURE

Unsaturated aliphatic compounds, especially soyabean oil, are catalytically hydrogenated by contacting with hydrogen in the presence of a solution of a platinum compound, for instance chloroplatinic acid, and a stannous halide, for instance stannous chloride, in a solvent comprising a lower dialkyl ether, dialkyl ketone or aliphatic carboxylic acid or its ester.

This invention relates to a process for the catalytic hydrogenation of unsaturated aliphatic compounds, that is, aliphatic compounds containing unsaturation provided by multiple carbon-carbon bonds.

The homogeneous hydrogenation of ethylene using a solution of a catalyst complex prepared by dissolving stannous chloride dihydrate and chloroplatinic acid in methanol has been described by Kramer et al., J. Amer. Chem. Soc., 1963, 85, 1691, who reported difficulty in hydrogenating higher olefins with this catalyst. Bailar and Itatani in the Proceedings of the Symposium on Co-ordination Chemistry, Tihany, 1964, at page 373, describe the use of a similar catalyst in the homogeneous catalytic hydrogenation of soyabean oil methyl ester. They found that the complexes did not catalyse the hydrogenation at atmospheric pressure, but could be used at a pressure of 500 lb./sq. in.

It has now been found that unsaturated aliphatic compounds, and especially unsaturated fatty acids and their esters, including soyabean oil, can be selectively hydrogenated using a liquid catalyst containing platinum and tin in solution and without restriction to high pressures, if the catalyst used is a solution of a platinum compound and a stannous halide in certain ethers, ketones, fatty acids or their esters, and that there is no difficulty in hydrogenating higher olefins using such catalysts.

A process of the invention is one for the liquid phase catalytic hydrogenation of an unsaturated aliphatic compound in which it is contacted with hydrogen in the presence of a solution of a platinum compound and a stannous halide in a solvent comprising (a) a dialkyl ether of formula $R_1OR_2$ where $R_1$ and $R_2$ are alkyl groups of from 1 to 5 carbon atoms whose combined total of carbon atoms is at least 4, (b) a dialkyl ketone of formula $R_3COR_4$ where $R_3$ and $R_4$ are alkyl groups of from 1 to 5 carbon atoms, or (c) an aliphatic carboxylic acid of from 2 to 10 carbon atoms in the molecule, or an ester of such acid.

The platinum compound used is preferably a chloroplatinum compound, and especially chloroplatinic acid ($H_2PtCl_6$) or chloroplatinous acid ($H_2PtCl_4$), or their alkali metal or ammonium salts, especially the disodium and dipotassium salts. The stannous halide is preferably stannous chloride. Preferably the platinum compound and stannous halide are used in a relative proportion providing from 3.5 to 10, and especially from 4 to 6, tin atoms for each platinum atom. The concentration of the catalytic metals in the catalyst solution can vary within wide limits, for instance from 0.01 to 1 mol percent of platinum, and the corresponding amount of tin, based on the total reaction mixture, but preferably a concentration of 0.01 to 0.1 mol percent of platinum is employed.

Where the catalyst solvent is an ether $R_1OR_2$, preferably $R_1$ and $R_2$ each have less than 4 carbon atoms, for instance the ether can be methyl propyl ether, methyl isopropyl ether, diethyl ether, ethyl propyl ether, ethyl isopropyl ether, dipropyl ether and diisopropyl ether; diethyl ether is most convenient.

Where the catalyst solvent is a ketone $R_3COR_4$, preferably $R_3$ and $R_4$ are each methyl or ethyl groups, so that particularly suitable ketones are acetone, methyl ethyl ketone and diethyl ketone: for convenience the solvent used is acetone.

Where the catalyst solvent is an aliphatic carboxylic acid of from 2 to 10 carbon atoms in the molecule, the acid is preferably a saturated one, and suitable acids are acetic, propionic, butyric, valeric, caproic, oenanthic and caprylic acids; glacial acetic acid is especially convenient. Esters of such acids that can be used as solvents include those with alcohols containing one or more than one hydroxy group, and preferably such alcohols contain from 1 to 10 carbon atoms in the molecule: alcohols with from 1 to 3 carbon atoms, for instance methanol, ethanol, propan-1-ol, propan-2-ol, glycol, propane-1,2-diol, propane-1,3-diol and glycerol are particularly suitable. The glycerol can be esterified with 1, 2 or 3 fatty acid radicals. Specific esters are ethyl acetate and glycerol triacetate.

Mixtures of solvents from each class or from different classes can be used if desired.

As substrate compounds for hydrogenation there can be used both ethylenic and acetylenic aliphatic compounds: there can, for example, be used olefins, for instance ethylene, propylene, hex-1-ene, oct-1-ene, and octadec-1-ene; acetylenes, such as ethyne and propyne; and especially unsaturated fatty acids and their esters, or mixtures of them, for example the unsaturated fatty acid glycerides used in hardening to give edible oils, for instance sunflower, safflower and cottonseed oils, which are derived from fatty acids including acids having 2 ethylenic bonds in the molecule, and fish, whale, soyabean and rapeseed oils, which are derived from fatty acids including acids having more than 2 ethylenic bonds.

The relative proportions of the substrate compound to be hydrogenated and the solvent of the catalyst solution can vary within wide ranges, for instance from 0.01 to 2, and preferably from 0.05 to 1, parts by weight or volume of substrate compound to 1 part of solvent.

In carrying out the hydrogenation process, it is convenient to prepare the catalyst complex by dissolving the platinum compound and stannous halide in the solvent chosen, to dissolve the substrate compound and then to bring the catalyst solution containing the compound into contact with hydrogen, for instance by shaking it with hydrogen gas, or passing hydrogen into the solution. The reaction mixture can be at room temperature, or at elevated temperature: preferably the temperature of the reaction mixture is between 15° and 80° C. or the boiling point of the solvent, whichever is the lower.

It is convenient to carry out the reaction at atmospheric pressure, but both higher and lower pressures can be used, for instance from 0.5 to 25 or 50 atmospheres: preferably a pressure of from 1 to 5 atmospheres is employed.

By selection of suitable reaction conditions, including hydrogen pressure, hydrogenation temperature, concentration of catalyst solution, stirring intensity and duration of hydrogenation, the extent of hydrogenation of the starting material can be chosen. As the catalyst is highly selective, it is possible to hydrogenate glyceride oils derived from acids having as many as 3 ethylenic double bonds, for instance soy bean oil, in such a way as to obtain a final product that contains practically only one ethylenic double bond. As the catalyst effects isomerisation of ethylenic bonds in the substrate compound, as well as hydrogenation of ethylenic bonds, it is possible to affect the degree of hydrogenation and isomerisation by varying the catalyst concentration. Thus, in the hydrogenation of hex-1-ene it is possible to promote the formulation of hex-2-ene by lowering the catalyst concentration, as by doing so the hydrogenation velocity is decreased more than the isomerisation velocity.

When hydrogenation has proceeded to the extent desired, which can be determined by the amount of hydrogen absorbed, or in suitable instances by the iodine value of the product, the product can be isolated by standard methods. For instance, where an acid is used as solvent, and an olefin is employed as substrate compound, the acid can be neutralised with dilute potassium hydroxide solution and the hydrocarbon separated off. Alternatively the volatiles can be distilled off from the reaction mixture and separated by fractional distillation in suitable instances where the solvent and the substrate have sufficiently different boiling points. Where a fatty acid ester is used as substrate and an acid as solvent, the latter can be neutralised with dilute alkali and the ester extracted with ether. Alternatively where an ether or ketone is used as solvent, water can be added and the product recovered from the non-aqueous layer which separates.

The invention is illustrated by the following examples, in which all temperatures are in ° C.

EXAMPLES 1 TO 18

Hex-1-ene (10 ml., 77 mmol.) was added to a solution of chloroplatinic acid hexahydrate ($H_2PtCl_6.6H_2O$, 500 mg., 1 mmol.) and stannous chloride dihydrate ($SnCl_2.2H_2O$, 1200 mg., 5.3 mmol.) in various solvents. The mixture was then shaken at various temperatures with hydrogen at atmospheric pressure until uptake of hydrogen became slow. A small portion of the product (2 ml.) was treated with water (10 ml.) and the separated phase containing the hydrocarbons was then analysed by gas/liquid chromatography (GLC) to determine the amounts of hexane (ane), trans-hex-2- and -3-enes (t-enes), cis-hex-2- and -3-enes (c-enes) and unconverted starting material (1-ene) in the hydrocarbon content of the product. The solvents and temperatures used, the duration of hydrogenation, and the results are given in the following table: in each instance the amount of solvent used was 120 ml., except with diisopropyl ether and oenanthic acid, where 240 ml. solvent was used, and glycerol triacetate, of which 100 ml. was used.

| Ex. No. | Solvent | Temperature, degrees | Duration, minutes | Product, percent | | | |
|---|---|---|---|---|---|---|---|
| | | | | ane | t-enes | c-enes | 1-ene |
| | Ether | | | | | | |
| 1 | Diethyl | 20 | 185 | 44 | 46 | 10 | 0 |
| 2 | Di-n-propyl | 20 | 105 | 79 | 16 | 5 | 0 |
| 3 | Diisopropyl | 40 | 100 | 41 | 49.4 | 9.6 | 0 |
| 4 | Di-n-butyl | 20 | 165 | 65 | 21 | 6 | 8 |
| | Ketone | | | | | | |
| 5 | Acetone | 20 | 35 | 60 | 27 | 13 | 0 |
| 6 | Methylethyl | 20 | 150 | 86 | 8 | 6 | 0 |
| 7 | Diethyl | 20 | 90 | 93 | 2 | 5 | 0 |
| 8 | Diisopropyl | 60 | 45 | 57 | 34 | 9 | 0 |
| 9 | Di-n-amyl | 40 | 90 | 85 | 9 | 6 | 0 |
| | Acid | | | | | | |
| 10 | Acetic | 20 | 75 | 66 | 26 | 8 | 0 |
| 11 | Propionic | 40 | 60 | 61 | 28 | 6 | 5 |
| 12 | Butyric | 40 | 60 | 61 | 33 | 6 | 0 |
| 13 | Valeric | 40 | 60 | 65 | 23 | 4 | 8 |
| 14 | Caproic | 40 | 60 | 65 | 28 | 5 | 2 |
| 15 | Oenanthic | 40 | 90 | 61 | 17 | 19 | 3 |
| 16 | Caprylic | 40 | 120 | 70 | 23 | 5 | 2 |
| | Ester | | | | | | |
| 17 | Ethy acetate | 20 | 40 | 74 | 17 | 9 | 0 |
| 18 | Glycerol triacetate | 60 | 100 | 38.5 | 48 | 13 | 0.5 |

EXAMPLE 19

Hex-1-ene (10 ml., 77 mmol.) was added to a solution of chloroplatinic acid hexahydrate (500 mg., 1 mmol.) and stannous chloride dihydrate (905 mg., 4 mmol.) in glacial acetic acid (120 ml.), and the mixture shaken at 30° with hydrogen at atmospheric pressure. After 30 minutes absorption of hydrogen was slow and hydrogenation was discontinued. A small amount (2 ml.) of the product was treated with water (10 ml.) and the separated phase containing hydrocarbons analysed by GLC. The hydrocarbon content of the product was found to consist of 54% hexane and 46% of the cis and trans forms of hex-2-ene and hex-3-ene: no hex-1-ene was present.

EXAMPLE 20

Hex-1-ene (10 ml.) was hydrogenated as in Example 19, except that 1580 mg. (7 mmol.) stannous chloride dihydrate was used. After 3 hours analysis of the product showed that 54% of the hydrocarbons present was hexane.

EXAMPLE 21

Oct-1-ene (20 ml.) was added to a solution of chloroplatinic acid hexahydrate (1000 mg.) and stannous chloride dihydrate (2400 mg.) in glacial acetic acid (240 ml.), and the mixture shaken at 20° with hydrogen at atmospheric pressure. After 1 hour absorption of hydrogen was slow and hydrogenation was discontinued. A small amount (2 ml.) of the product was treated with water (10 ml.) and the separated phase containing hydrocarbons analysed by GLC. The hydrocarbon content of the product was found to consist of 67.5% octane and 32.5% octenes.

EXAMPLE 22

Octadec-1-ene (10 ml.) was added to a solution of chloroplatinic acid hexahydrate (500 mg.) and stannous chloride dihydrate (1200 mg.) in glacial acetic acid (120 ml.), and the mixture shaken at 20° with hydrogen at atmospheric pressure. After 2 hours absorption of hydrogen was slow and hydrogenation was discontinued. A small amount (2 ml.) of the product was treated with water (10 ml.) and the separated phase containing hydrocarbons analysed by GLC. The hydrocarbon content of the product was found to consist of 61.2% octadecane and 38.8% octadecenes.

EXAMPLE 23

Soyabean oil (50 ml.) was added to a solution of chloroplatinic acid hexahydrate (1000 mg.) and stannous chloride dihydrate (2400 mg.) in acetone (240 ml.), and the mixture shaken at 40° with hydrogen at atmospheric pressure, the volume of hydrogen absorbed being followed, and a sample being withdrawn from time to time; the glyceride oil content of each sample was isolated from catalyst and solvent, its refractive index, melting point, iodine value and trans ethylenic bond content determined, and the $C_{18}$ fatty acid content analysed by GLC.

The results are given in the following table, where A, B, C, D and E are respectively the amounts of saturated, monoene, diene, isomerised diene, and triene $C_{18}$ acids present in the fatty acids of the glyceride oil. About 12% $C_{16}$ acids were also present.

| Duration, hours | Hydrogen absorbed, ml. | $n_D^{65}$ | M.P., degrees | I.V. | Trans, percent | $C_{18}$ Fatty acid content | | | |
|---|---|---|---|---|---|---|---|---|---|
| | | | | | | A | B | C | D+E |
| 0 | | 1.4587 | <0 | 133 | 0 | 4½ | 22 | 57½ | 5 |
| 1 | 120 | 1.4583 | <0 | 122.5 | 35 | 4½ | 22½ | 40 | 17½ |
| 2 | 805 | 1.4579 | 23 | 103 | 56 | 4½ | 43½ | 23 | 17 |
| 3½ | 1,655 | 1.4547 | 30 | 87.5 | 58 | 5 | 60½ | 10 | 14 |
| 5½ | 2,240 | 1.4522 | 34 | 75.5 | 65 | 6½ | 74½ | 4 | 4 |
| 8½ | 2,750 | 1.4508 | 39 | 67.6 | 58 | 6 | 74 | 4 | 3 |
| 12 | 3,215 | 1.4503 | 43 | 60.6 | 51 | 19 | 63 | 3½ | 3½ |

EXAMPLES 24 TO 28

Portions of soyabean oil dissolved in a solution of chloroplatinic acid hexahydrate (500 mg.) and stannous chloride dihydrate (1200 mg.) in glacial acetic acid (120 ml.) at various temperatures were shaken with hydrogen at atmospheric pressure until hydrogen absorption was very slow, and the product examined as in Example 23. The amount of soyabean oil was 25 ml. in each instance, except for the reaction at 20°, where 10 ml. oil was used. The results are given in the following table, where A, B, C and E are respectively the amounts of saturated, monoene, diene and triene $C_{18}$ acids present in the total fatty acids.

| | Temperature, degrees | Duration, hours | Hydrogen absorbed, ml. | $n_D^{65}$ | M.P., degrees | I.V. | Trans, percent | $C_{18}$ Fatty acid content | | | |
|---|---|---|---|---|---|---|---|---|---|---|---|
| | | | | | | | | A | B | C | E |
| Example No.: | | | | | | | | | | | |
| 24 | 20 | 8 | 431 | 1.4528 | 28 | 78 | 55 | 5½ | 74½ | 4½ | 3 |
| 25 | 40 | 24 | 1,246 | 1.4520 | 33 | 76 | 56 | 5½ | 79½ | 3½ | 0 |
| 26 | 50 | 15 | 1,315 | 1.4533 | 31 | 74 | 56 | 4½ | 78 | 3½ | 0 |
| 27 | 60 | 17 | 1,124 | 1.4512 | 31 | 67 | 54 | 6 | 73½ | 3½ | 0 |
| 28 | 70 | 13 | 1,035 | 1.4521 | 32 | 71 | 56 | 6 | 74½ | 3½ | 0 |
| Soyabean oil starting material | | | | 1.4582 | <0 | 133 | 0 | 4½ | 22 | 57½ | 5 |

EXAMPLE 29

Soyabean oil was hydrogenated exactly as in Example 23, except that the acetone solvent was replaced by glacial acetic acid (240 ml.), and samples of the product at various stages of the hydrogenation were examined, the $C_{18}$ fatty acid content of the total fatty acids being determined as before. The results were as follows.

| Duration, hours | Hydrogen absorbed, ml. | $n_D^{65}$ | M.P., degrees | I.V. | Trans, percent | $C_{18}$ Fatty acid content | | | | |
|---|---|---|---|---|---|---|---|---|---|---|
| | | | | | | A | B | C | D | E |
| 0 | 0 | 1.4582 | <0 | 133 | 0 | 4.5 | 22 | 57½ | 0 | 5 |
| ½ | 382 | 1.4577 | <0 | 121 | 11 | 5 | 33½ | 45 | 0 | 5 |
| 1 | 738 | 1.4571 | <0 | 113 | 19 | 5 | 40½ | 39 | 0 | 4½ |
| 2 | 1,290 | 1.4559 | 16 | 101.5 | 33 | 5 | 51½ | 26½ | 0 | 5 |
| 4 | 2,022 | 1.4542 | 23 | 88 | 41 | 4.5 | 65½ | 13 | 0 | 5½ |
| 6 | 2,394 | 1.4533 | 28 | 81 | 49 | 5 | 72½ | 6 | 0 | 4 |
| 8 | 2,582 | 1.4523 | 30 | 78 | 55 | 5 | 79 | 1½ | 0 | 3 |
| 10 | 2,678 | 1.4521 | 31 | 75.5 | 57 | 4.5 | 80½ | 2 | 1 | 0 |
| 12 | 2,731 | 1.4520 | 31½ | 75.7 | 60 | 5.5 | 79½ | 2 | 1 | 0 |
| 15 | 2,799 | 1.4518 | 33 | 74.7 | 60 | 5.5 | 79 | 2 | 1½ | 0 |

EXAMPLE 30

The hydrogenation of soyabean oil of Example 23 was repeated but using as solvent propionic acid (240 ml.) instead of acetone. The results were as follows.

| Duration, hours | Hydrogen absorbed, ml. | $n_D^{65}$ | M.P., degrees | I.V. | Trans, percent | $C_{18}$ Fatty acid content | | | |
|---|---|---|---|---|---|---|---|---|---|
| | | | | | | A | B | C | D+E |
| 0 | 0 | 1.4583 | <0 | 138.6 | 0 | 4 | 22 | 58 | 5 |
| ½ | 478 | 1.4562 | <0 | 123.2 | 15 | 4 | 33½ | 43 | 6½ |
| 1 | 855 | 1.4562 | <0 | 120.8 | 24 | 4 | 40 | 36½ | 8½ |
| 2 | 1,411 | 1.4549 | 18 | 110.7 | 35 | 4½ | 49 | 26 | 9½ |
| 4 | 2,200 | 1.4535 | 24 | 85.7 | 40 | 5½ | 69 | 13 | 0 |
| 6 | 2,795 | 1.4531 | 28 | 80.2 | 47 | 5 | 75 | 7 | 0 |
| 10 | 3,520 | 1.4526 | 30.5 | 75.6 | 64 | 6 | 78 | 2 | 1 |
| 15 | 3,960 | 1.4517 | 31 | 75.2 | 64 | 6 | 79½ | 1½ | ½ |

EXAMPLE 31

Soyabean oil (50 ml.) was hydrogenated by shaking with hydrogen at a pressure of 4 atmospheres in a solution containing chloroplatinic acid hexahydrate (1000 mg.), stannous chloride dihydrate (2400 mg.) and glacial acetic acid (240 ml.), the temperature of the reaction mixture being 60°. After 4½ hours the hydrogenation was discontinued and the product isolated from the catalyst and solvent and examined. The hydrogenation product had $n_D^{25}$ 1.4532, M.P. 30°, I.V. 79.4, 60% of the ethylenic bonds were in the trans configuration, and the fatty acid content of the glyceride oil consisted of 12.5% $C_{16}$ acids, and 5.0% saturated, 71.5% monoene, 4.0% diene, and 7.0% isomerised diene together with triene, $C_{18}$ acids.

What is claimed is:

1. A process for the catalytic hydrogenation of soybean oil comprising the steps of contacting soybean oil with hydrogen in the presence of a solution of a chloroplatinum compound selected from the group consisting of chloroplatinic acid, chloroplatinous acid and the alkali metal and ammonium salts thereof and stannous chloride in a solvent selected from the group consisting of acetone, glacial acetic acid and propionic acid, said process being carried out at pressures from about 15 to 25 atmospheres and at temperatures from about 15° C. to about 80° C. or at the boiling point of the solvent whichever is lower.

2. A process according to claim 1, in which the chloroplatinum compound and stannous chloride are used in a relative proportion providing from 3.5 to 10 tin atoms for each platinum atom.

References Cited

UNITED STATES PATENTS

| | | | |
|---|---|---|---|
| 1,097,456 | 5/1914 | Maryott | 260—409 |
| 3,210,296 | 10/1965 | Gray | 260—683.68 |

OTHER REFERENCES

Cramer et al., Jour. Amer. Chem. Soc. (1963) 85, pp. 1691–1692.

Cousins et al., Jour. Amer. Oil Chemists Soc., 37, No. 9, pp. 435–438 (1960).

Koritala et al., Jour. Amer. Oil Chemists Soc., 42, No. 12, pp. 1150–1152 (1965).

Bailar et al., Jour. Amer. Oil Chemists Soc., 43 No. 6, pp. 337–341 (1966).

Bailar et al. II, Proceedings of the Symposium on Coordination Chemistry, Tihany (1964).

Akademiai Kiadu, Budapest (1965), pp. 67–81.

LEON ZITVER, Primary Examiner

H. T. MARS, Assistant Examiner

U.S. Cl. X.R.

260—683.9, 683.68, 690

UNITED STATES PATENT OFFICE
CERTIFICATE OF CORRECTION

Patent No. 3,489,778           Dated January 13, 1970

Inventor(s) Leendert Pieter van 't Hof

It is certified that error appears in the above-identified patent and that said Letters Patent are hereby corrected as shown below:

Column 3, line 21 the word "soy" should read --soya--.

Column 4 in the table showing Ex. No.'s 1-18, change the ester of Ex. No. 17 from "Ethy acetate" to --Ethyl acetate--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents